United States Patent [19]

Desfontaines et al.

[11] Patent Number: 4,752,438

[45] Date of Patent: Jun. 21, 1988

[54] CLUSTER GUIDE WITH CENTERING AND ANTIVIBRATORY POSITIONING DEVICE FOR NUCLEAR REACTORS

[75] Inventors: Guy Desfontaines, Puteaux; Michel Babin, Pantin, both of France

[73] Assignee: Framatome, Courbevoie, France

[21] Appl. No.: 935,365

[22] Filed: Nov. 26, 1986

[30] Foreign Application Priority Data

Nov. 29, 1985 [FR] France ................................ 85 17686

[51] Int. Cl.⁴ .............................................. G21C 1/01
[52] U.S. Cl. ..................................... 376/285; 376/353
[58] Field of Search .................................. 376/285, 353

[56] References Cited

U.S. PATENT DOCUMENTS 4,584,168  4/1986  Formanek ........................... 376/353

FOREIGN PATENT DOCUMENTS 0069596  4/1985  Japan .................................... 376/353

Primary Examiner—Deborah L. Kyle
Assistant Examiner—Richard W. Wendtland
Attorney, Agent, or Firm—Pollock, Vande Sande & Priddy

[57] ABSTRACT

A tubular cluster guide for use in a nuclear reactor having upper internals comprising a lower plate formed with flow openings is fixed to an upper plate of the intervals and provided with a device for guiding and centering its lower part in the lower core plate. The centering device has a plurality of rigid blades carried by the lower part of the guide, spaced apart angularly about the axis of the guide and engagable in an opening of the lower plate with a radial clearance and a plurality of flexible blades between the rigid blades. The flexible blades bear on the edge of the opening and exert a radially directed force thereon. Bridges may be formed in the lower plate to retain a broken resilient blade.

11 Claims, 4 Drawing Sheets

CLUSTER GUIDE WITH CENTERING AND ANTIVIBRATORY POSITIONING DEVICE FOR NUCLEAR REACTORS

BACKGROUND OF THE INVENTION

1. Technical Field

The present invention relates to the upper internals of nuclear reactors and it is particularly suitable for use in water cooled and moderated reactors.

2. Prior Art

Such reactors are already known having a core formed by adjacent upstanding fuel assemblies, and internals comprising a lower plate formed with outlet openings for the coolant flowing out of the fuel assemblies, an upper plate, supporting columns connecting the plates together and tubular guides for control clusters movable vertically between a position in which they are inserted in the core and a position in which they are out of the core. The guides are individually fixed to the upper plate and each provided with a device for guiding and centering their lower part on the lower plate.

The purpose of the control cluster guides is to guide the rods of the clusters, to prevent deformation thereof and to protect these elements whatever their position during normal operation of the reactor and under accident conditions. They generally comprise a tube, transverse plates, frequently called "cards" distributed along the upper part for individually guiding the rods at intervals and, at its lower part, split tubes each assigned to a rod. Such guides are described for example in U.S. Pat. No. 4,173,513 (OBERMEYER) et al), French Pat. Nos. 83 09275 (FRAMATOME), and 81 05037 (FRAMATOME).

Various devices for guiding and centering the guides with respect to the lower plate of the internals are known. They are generally so designed that the guides can move axially with respect to the lower plate, particularly to allow free expansion thereof during use and for facilitating mounting or removal as required, while closing the clearances necessary for slidably guiding the rods, for avoiding vibration of the guides induced by the turbulence generated by the coolant. The devices must limit lateral deflection of the guides in the case of an earthquake or accidental depressurization of the reactor, for instance upon failure of the outlet nozzle, so that the guides remain alignmed with respect to the fuel assemblies and continue to allow free movement of the control clusters. The guide devices are often formed of resilient members which have the disadvantage of simultaneously fullfilling all the preceding functions. The design parameters are consequently critical since the guiding devices must both be sufficiently flexible for accomodating assembly misalignments resulting from the manufacturing tolerances of the guides and the inner and upper plates of the upper internals and sufficiently rigid for preventing vibration of the guides and deflection thereof in the case of accidental stresses.

Such prior art is exemplified by centering devices formed by a split pin, engaging in a hole in the lower plate (U.S. Pat. No. 4,173,513). These known devices require accurate positioning so that engagement of the resilient members into the holes provides in the lower plate does not generate excessive stresses in the resilient members.

SUMMARY OF THE INVENTION

It is an object of the invention to provide an improved cluster guide for upper internals; it is a more particular object to dissociate the resilient centering function from the function of limiting the amount of radial deflection in the case of accidents (such as sudden depressurization or earthquake).

To this end, there is provided a guide whose centering device in an opening of the lower plate comprises a set of a plurality of rigid plates or lugs carried by the lower part of the guide, spaced apart angularly about the axis of the guide and arranged to engage into the opening with a radial clearance, and a set of a plurality of flexible blades located between said rigid blades and also fixed to the lower part, having a shape at rest such that they bear on the edge of the opening and exert a resilient centering force thereon.

This arrangement dissociates the two functions consisting of (a) centering the guide while leaving a radial clearance, provided by the resilient blades and (b) limiting the amount of lateral deflection, provided by the rigid plates.

The amount of possible deflection of the cluster guide and the flexure stresses in the resilient blades are thus reduced.

The two sets are advantageously carried by a base fixed to the body of the guide. Provided the contacting surfaces of the body and of the base have a circular cross-section, it is possible to insert the base after the elements for continuous guiding of the cluster rods have been mounted, in any appropriate angular position.

The base or the lower plate advantageously comprises means for retaining the flexible blades in the case of breakage thereof and preventing them from moving loose along the primary circuit of the reactor.

The invention will be better understood from the following description of particular embodiments, given by way of examples.

DESCRIPTION OF PREFERRED EMBODIMENTS

Figure 1:
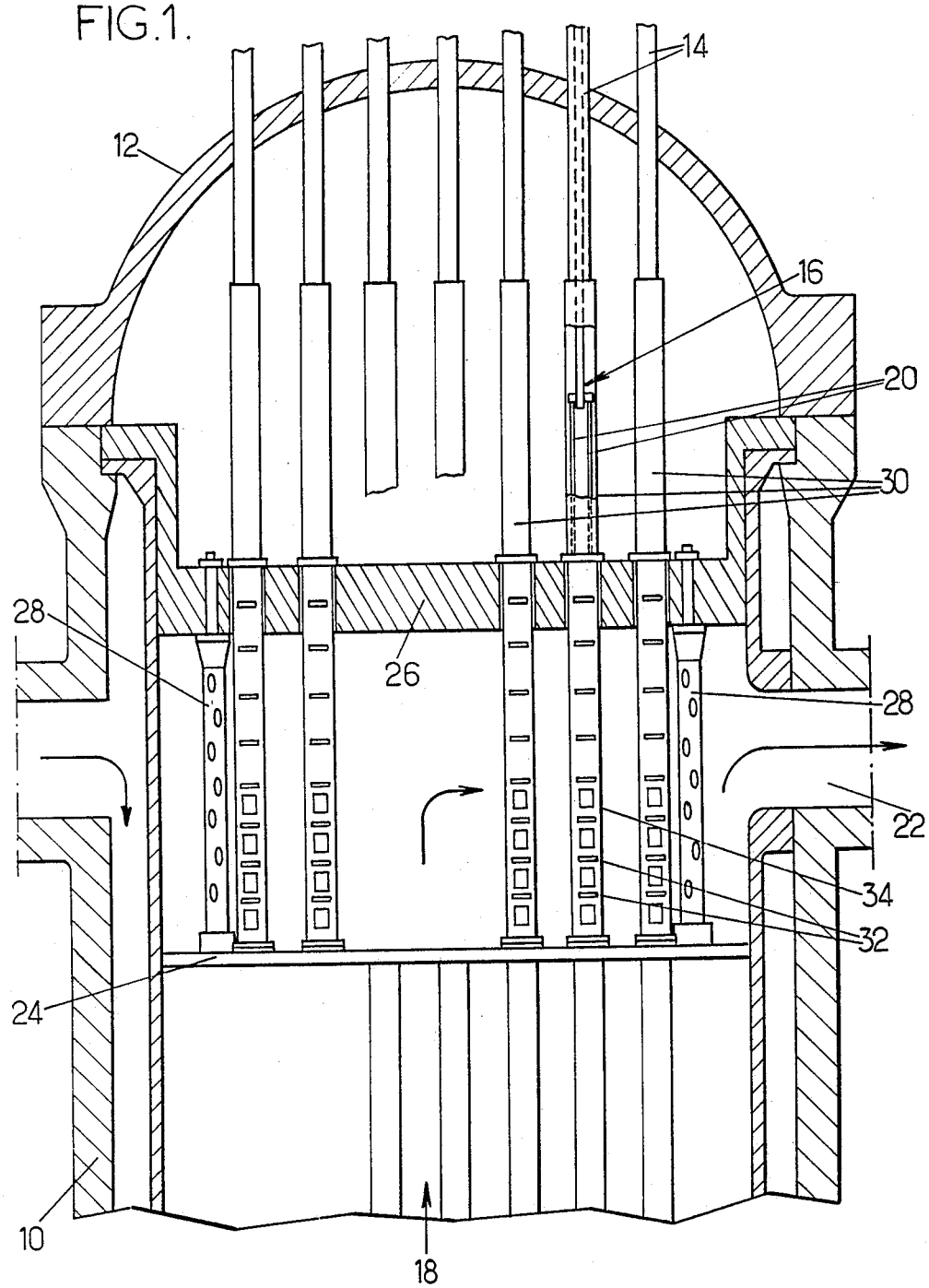
FIG. 1 is a simplified vertical cross section, of the upper part of a reactor in which the invention may be implemented.

The invention will be described, by way of example, as applied to a pressurized water reactor of the kind shown in FIG. 1. Referring to FIG. 1, a reactor comprises a pressure vessel 10 for withstanding the pressure of the water acting as coolant and moderator. The vessel is closed by a lid 12 which carries mechanisms 14 for moving the control clusters, a single one of which is shown at 16. Vessel 10 contains the core 18 formed by adjacent fuel assemblies each having a skeleton and a bundle of fuel rods distributed in a regular polygonal array (square or triangular). The skeleton of each assembly comprises guide tubes (not shown) slidably receiving absorbing rods 20 belonging to a control cluster (or possibly to a cluster for varying the neutron energy spectrum).

A mechanical welded assembly, which is generally designated as the upper internals, is located above the core. This assembly fulfills several functions. It collects the high temperature water flow leaving the core and diverts it towards the output nozzle 22 of vessel 10. It retains and indexes the fuel assemblies 18. Finally, it guides the control clusters 16 insertable into some at least of the assemblies during their vertical movements.

The upper internals shown in FIG. 1 comprise a lower plate 24 which receives the upwardly directed thrust of the assemblies and an upper plate 26 which transfers the forces applied to the assembly (upper internals) to vessel 10. Plates 24 and 26 are connected together by spacer columns 28 of tubular shape, formed with wide openings for coolant flow. Finally, guides 30 for clusters 16 extend from the lower plate 24 up to the upper plate 26 and beyond. Each guide generally comprises a sleeve 34 whose top part is rigidly fixed to the upper plate 26, and slidably receive the part (frequently called "spider") to which the rods 20 are fixed. Transverse plates 32, often called "cards", formed with openings allowing the spider and the rods to pass therethrough, provide discontinuous guiding of the latter. At the lower part of the guide, the elements are guided continuously by split tubes 36 or equivalent members. For allowing relative expansion of the guides and of the upper internals, the guides are generally each guided in an opening 38 in the lower plate 24, but are not secured thereto.

The arrangement which has just been described is generally known. A description thereof can be found in prior art documents already mentioned and for example in French Pat. Nos. 8409275 or 2501892.

Figure 2:
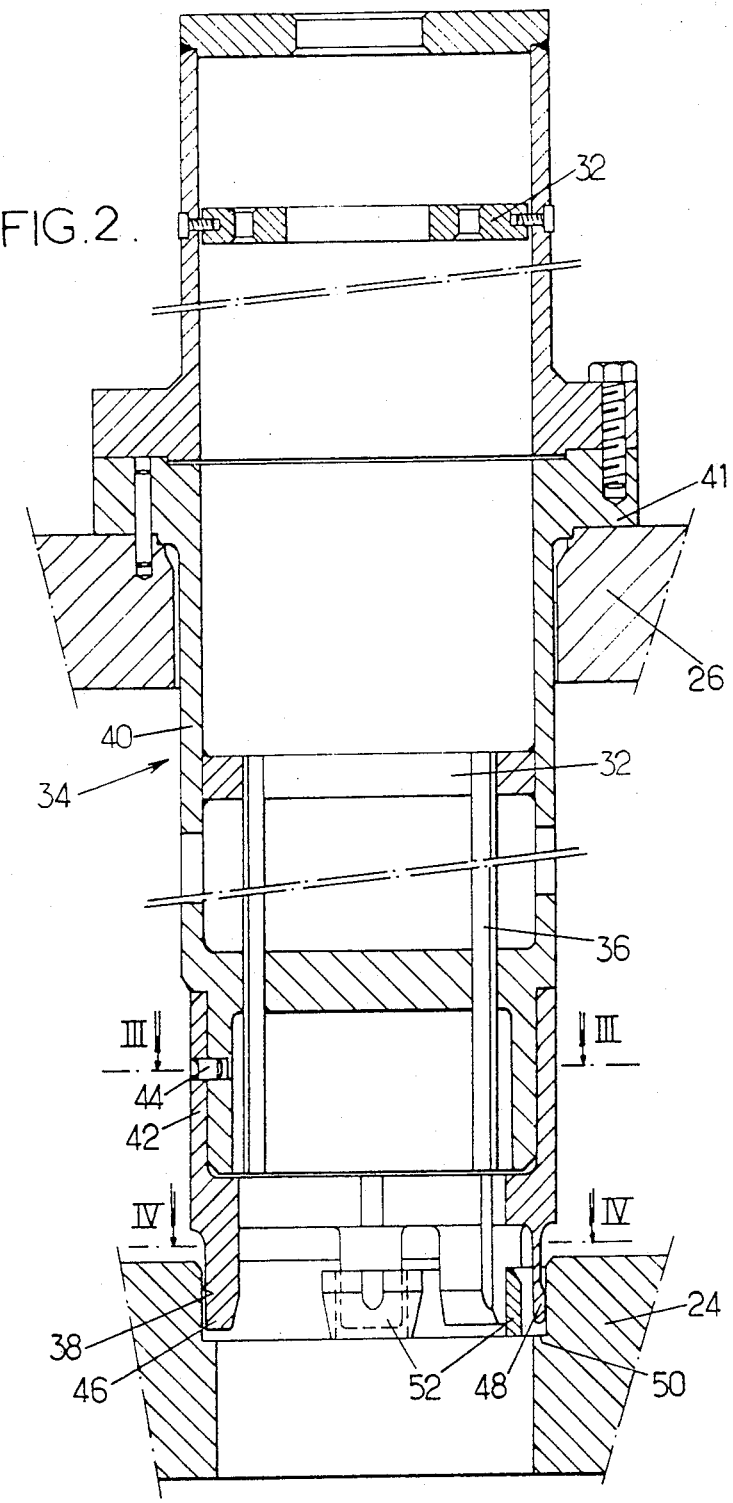
FIG. 2 is a cross-sectional enlarged view taken on line II—II of FIG. 4, showing a guide device in accordance with the invention for use in the reactor of FIG. 1, FIGS. 3 and 4 are sectional views through lines III—III and IV—IV of FIG. 2, and FIGS. 5 and 6, similar to FIG. 4, show modifications thereof.
Figure 3:
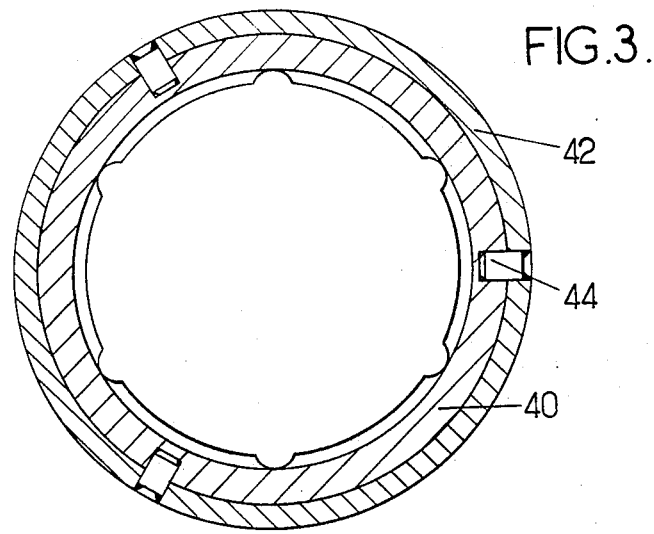
Figure 4:
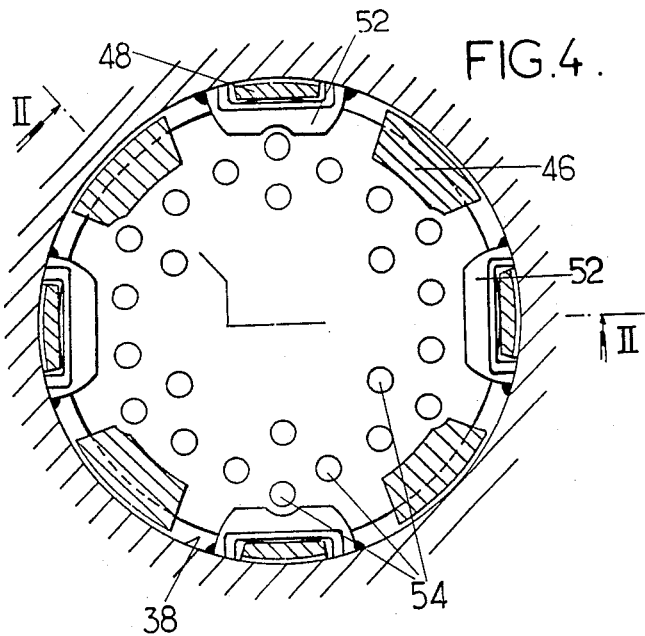

In the embodiment of the invention which is shown in FIGS. 2 to 4, a sleeve 34 of the guide has a tubular body 40 whose top end is provided with a flange 41 for connection to the upper plate 26 and a base 42 fitted onto the lower part of the body and fixed thereto by pins 44 (FIGS. 2 and 3). The lower part of the base is machined to form a set of rigid blades or lugs 46 and a set of flexible blades 48. Referring to FIG. 4, the blades of the two sets are alternated and distributed evenly angularly. Opening 38 is cylindrical in shape and it has a shoulder 50 for retaining base 42 if required.

The rigid blades have radially outer part-cylindrical surfaces having a diameter less than that of opening 38 so as to leave a radial clearance in the 1 mm range. That order of magnitude was selected as a compromise between acceptable manufacturing tolerances and accuracy of mutual alignment of the guides and fuel assemblies. The flexible blades have a thinner part, for giving them the required flexibility, and an end bulge which the elasticity of the blade tends to apply against the edge or cylindrical surface which defines opening 38. The number of blades in each set may be greater than four and in general the blades will be even in number.

So that, upon breakage of a flexible blade, this blade is not carried away by the coolant, individual retaining means are advantageously provided for the blades. As shown in FIGS. 2 and 4, the retaining means comprise bridges 52 fixed to the wall of the opening 48, for example by welding, and each surrounding one of the flexible blades. As shown in FIG. 4, indentations may be formed in some of the bridges and/or in some of the thick rigid blades 46 for avoiding interference with control cluster rods, such as those rods 54 whose distribution is shown schematically in FIG. 4.

When, as in the embodiment shown in FIGS. 2 to 4, the contacting surfaces of base 42 and body 40 are circular in cross-section, the base may be set angularly on the body in the appropriate orientation for which the blades are in alignment with bridges 52, after the lowest card 32, which carries the tubes 36 for continuous guiding, has been mounted.

Figure 5:
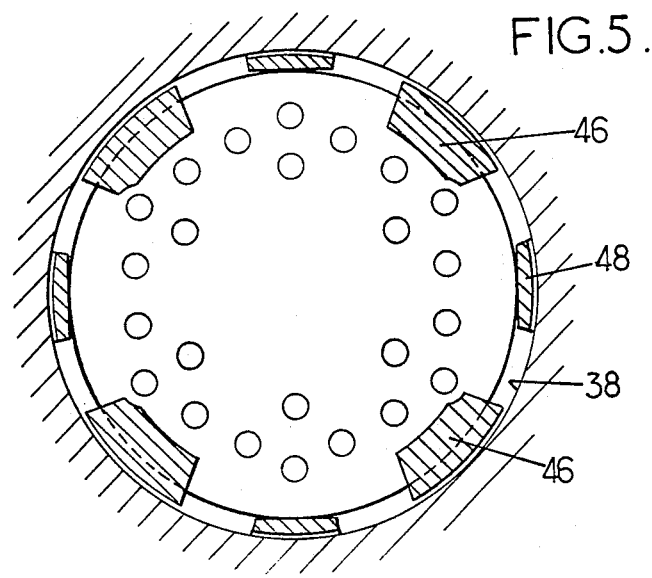
Figure 6:
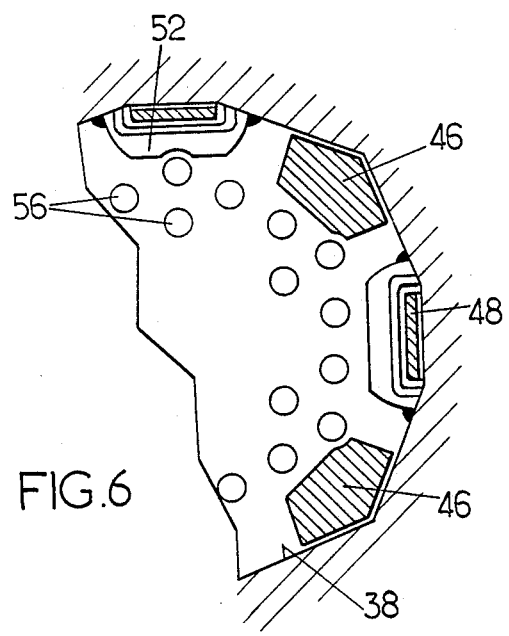

The modified construction shown in FIG. 5 differs from that of FIG. 4 solely by the absence of bridges. That of FIG. 6 comprises an opening 38 having a cross section which is not circular but polygonal, each of the thick blades 46 being located in a respective angle of the polygon. This arrangement prevents the lower part of the cluster guide from rotating about the axis of the guide.

We claim:

1. In a nuclear reactor having upper internals comprising a lower plate with openings for flow of coolant out of fuel assemblies, an upper plate, support columns connecting the plates together and tubular guides for slidably receiving vertically movable control clusters, said guides being fixed individually to the upper plate,
a device for individually guiding and centering the lower part of each of said guides in the lower core plate, comprising: a plurality of rigid blades carried by the lower part of the guide, spaced apart angularly about a vertical axis of the guide and engaged in said opening with a predetermined radial clearance, and a plurality of flexible blades located between said rigid blades and fixed to the lower part, having a shape at rest such that they resiliently bear on an edge defining the opening and exert a radial force thereon.

2. Device according to claim 1, wherein the opening and the pluralities of blades have a rotational symmetry about the axis of the guide.

3. Device according to claim 2, wherein the opening is cylindrical in shape.

4. Device according to claim 2, wherein the opening is polygonal in shape, each angle of the polygon receiving one of the rigid blades.

5. Device according to claim 1, wherein said guide has a body and a base fixed to said body and wherein the pluralities of blades are fast with said base.

6. Device according to claim 5, wherein the blades are integral with the base.

7. Device according to claim 5, wherein contacting surfaces of the body and of the base have circular cross-sections and the base is provided with means for securing it to the body in an adjustable orientation.

8. Device according to claim 1, wherein the lower plate comprises means for retaining the flexible blades upon breakage thereof and preventing them from getting loose.

9. Device according to claim 8, wherein said means comprise a plurality or bridges each associated with a flexible blade and each fixed to the edge of the opening.

10. Device according to claim 1, wherein said radial clearance is of about 1 mm.

11. In a nuclear reactor having upper internals comprising a lower plate with openings for flow of coolant out of fuel assemblies, an upper plate, support columns connecting the plates together and tubular guides for slidably receiving vertically movable control clusters, said guides being fixed individually to the upper plate, a device for individually guiding and centering the lower part of each of said guides in the lower core plate, comprising: at least three rigid blades distributed at equal angular intervals about an axis of said guide, fast with said guide and projecting downwardly from said guide into an opening of said lowere core plate dimensioned to provide a radial clearance to said rigid blades; and at least three flexible blades interleaved with said rigid blades, fast with said guide and projecting downwardly from said guide into said opening, said flexible blades being so dimensioned when in released condition that they are resiliently bent inwardly by a surface of said lower core plate defining said opening when inserted in said opening.

* * * * *